United States Patent
Wei et al.

[11] Patent Number: 5,391,339
[45] Date of Patent: * Feb. 21, 1995

[54] CONTINUOUS PROCESS FOR PRODUCING ALUMINA-TITANIUM CARBIDE COMPOSITES

[75] Inventors: George C.-T. Wei, Weston; John Walsh, Milford, both of Mass.

[73] Assignee: Valenite Inc., Madison Heights, Mich.

[*] Notice: The portion of the term of this patent subsequent to Aug. 30, 2011 has been disclaimed.

[21] Appl. No.: 999,501

[22] Filed: Dec. 31, 1992

[51] Int. Cl.⁶ ............... C04B 35/10; C04B 35/64
[52] U.S. Cl. ........................ 264/65; 264/57; 264/63; 264/66
[58] Field of Search ............ 264/57, 63, 65, 66

[56] References Cited

U.S. PATENT DOCUMENTS

| | | | |
|---|---|---|---|
| 4,063,908 | 12/1977 | Ogawa et al. | 51/307 |
| 4,490,319 | 12/1984 | Lee et al. | 264/65 |
| 4,762,655 | 8/1988 | Rhodes et al. | 264/65 |
| 4,792,353 | 12/1988 | Kramer et al. | |
| 4,797,238 | 1/1989 | Rhodes et al. | 264/65 |
| 4,948,538 | 8/1990 | Wei et al. | 264/65 |

FOREIGN PATENT DOCUMENTS 63-134644 6/1988 Japan.

OTHER PUBLICATIONS

Rapid Rate Sintering of $Al_2O_3$—TiC Composites for Cutting—Tool Application—Lee, et al., In Advanced Ceramics Materials, 38–44 (1988).
Fast Firing of Alumina Ceramics—Harmer, et al., Materials Science Mongraph, 6, Energy & Ceramics, 1980 Elsevier Pub. Corp.
Pressureless sintering of TiC–$Al_2O_3$ composites, Ishigaki, et al., In Journal of Materials Sci & Letters, 1989, pp. 678–680.
Pressureless Sintering of Alumina—Titanium Carbide Composites—Kim et al., In J. Am. Ceramic Sci., 72, 8, 1333–1337 (1989).
Fracture Toughness of the Systems $Al_2O_3$—TiC Ceramic—Furukawa, In Nippon Tungsten Review, vol. 18, 1985, pp. 16–22.
Fracture behavior of composites based on $Al_2O_3$—TiC, Wahl, et al., In Journal of Materials Science, 1980, pp. 875–880.
Pressureless—sintered $Al_2O_3$—TiC Composites, Cutler, et al., In Materials Science & Eng., A105/106, 1988, pp. 183–192.

*Primary Examiner*—James Derrington
*Attorney, Agent, or Firm*—Bill C. Panagos

[57] ABSTRACT

A method of making a continuously sintered ceramic body. A ceramic green body is prepared from a powder mixture comprising alumina, TiC (or Ti(C,N)), in a weight ratio of alumina to TiC of about 40:60–95:5, a densification aid, and $TiO_2$ in a weight ratio of $TiO_2$ to alumina plus TiC of 0:100 to about 2:98. The green body is prefired, then continuously rapid sintered by heating in a belt furnace in Ar or $N_2$ containing up to 8 w/o $H_2$ to about 1800°–1920° C. for a time sufficient to achieve a density of at least about 4.12 g/cc. The rate of travel of the prefired body through the belt furnace provides a heating rate above about 800° C. between about 225° C./min. and the rate at which the body experiences thermal shock. Carbon monoxide is intoduced to the atmosphere during the sintering step only after the temperature exceeds about 1400° C. The amount of CO introduced is selected to inhibit reaction between the alumina and TiC. The CO may be introduced by placing a mass of graphite in the furnace such that CO is released only above 1400° C. The body may be prepared from a homogeneous slurry, and the green body may be presintered, isopressed, and sintered or sintered and hot-isostatic-pressed.

12 Claims, 1 Drawing Sheet

CONTINUOUS PROCESS FOR PRODUCING ALUMINA-TITANIUM CARBIDE COMPOSITES

REFERENCE TO RELATED APPLICATIONS

This application is related to commonly assigned, copending U.S. Ser. No. 07/999,254, filed concurrently herewith.

BACKGROUND OF THE INVENTION

This invention relates to a continuous process for producing a fully dense ceramic material, in particular an aluminum oxide-titanium carbide or carbonitride composite material suitable for use in cutting tools and wear resistant structural materials.

U.S. Pat. No. 4,490,319 to M. Lee et al. discloses a rapid rate sintering process for ceramics and composites including $Al_2O_3$—TiC. The maximum density achieved by rapid sintering is 98% of the theoretical density. High-purity helium is used as the sintering atmosphere in a molybdenum-element furnace. The examples do not include the use of $TiO_2$ as a sintering aid. The process is a two-step process involving sintering followed by hot isostatic pressing (a sinter-HIP process). M. Lee et al. ("Rapid Rate Sintering of $Al_2O_3$—TiC Composites for Cutting Tool Applications", *Advanced Ceramics Materials* 3 [1], 38–44 (1988)) report the findings disclosed in above-referenced U.S. Pat. No. 4,490,319. In addition, they describe the use of a 100% CO or CO-helium (at partial pressures ranging from 1:40 to 1:1) sintering atmosphere, which their data show to be detrimental to rapid sintering of $Al_2O_3$—TiC.

U.S. Pat. No. 4,063,908 to K. Ogawa et al. discloses the use of $TiO_2$ densification aid for hot pressed $Al_2O_3$—TiC. However, the $TiO_2$ densification aid is used for hot pressing only. Harmer et al. (*Proc.* 4th International Mtg. on Modern Ceramics Technologies, St. Vincent, Italy, May 1979, ed. P. Vincenzini, Elsevier Sci. Publ. Co., Amsterdam, 1980, 155–162) report fast firing of alumina ceramics doped with MgO or $TiO_2$ in a zone sintering furnace at 1850° C. for 2–15 min. in air or oxygen.

U.S. Pat. No. 4,797,238 to W. H. Rhodes et al. discloses a rapid sintering process for improving translucence in alumina lamp tubes. The heating rate is at least 0.1° C./sec. and less than the rate at which the green body experiences thermal shock. The process uses a flowing gas mixture of nitrogen and at least about 2.5 v/o (volume percent) hydrogen to produce a translucent polycrystalline alumina lamp tube in a belt furnace. U.S. Pat. No. 4,762,655 to W. H. Rhodes et al. discloses the use of a sintering atmosphere of nitrogen and an amount of hydrogen of at least 2.5 v/o and less than 75 v/o to produce a translucent polycrystalline alumina lamp tube in a static furnace. In U.S. Pat. No. 4,948,538 to G. C. Wei et al., the dew point of a $N_2$-8 v/o $H_2$ sintering atmosphere is controlled while producing a translucent alumina lamp tube in a belt furnace or a static furnace.

R. A. Cutler et al. ("Pressureless-sintered $Al_2O_3$—TiC Composites", *Mat. Sci. and Eng.*, A105/106, 183–192 (1988)) disclose sintering of $Al_2O_3$ containing 26.3 w/o (weight percent) TiC and 3.7 w/o $TiH_2$ at 1840° C. in nitrogen to 4.22 g/cc density or 97.5of the theoretical density, at a moderate heating rate, 40°-50° C./min., in a graphite furnace. T. Ishigaki et al. ("Pressureless Sintering of TiC—$Al_2O_3$ Composites", *J. Mat. Sci. Letters* 8, 678–680 (1989)) disclose the addition of 0.5 w/o MgO to $Al_2O_3$-25 v/o TiC resulting in a sintered density of 99% of theoretical in uniaxially hot pressed samples.

Y. Kim et al. ("Pressureless Sintering of Alumina-TiC Composites", *J. Am. Cer. Soc.* 72 [8], 1333–37 (1989)) use a setter powder of alumina, TiC, carbon, and combinations thereof to achieve a sintered density of 96.7% of theoretical for $Al_2O_3$ containing 30 w/o TiC and doped with 0.1 w/o MgO. M. Furukawa et al. ("Fracture Toughness of the System $Al_2O_3$—TiC Ceramics", *Nippon Tungsten Review* 18, 16–22 (1985)) disclose that the fracture toughness of alumina composites increases with increasing TiC content up to a maximum at 60 w/o TiC, and then decreases with increasing TiC content.

R. P. Wahi et al. ("Fracture Behavior of Composites based on $Al_2O_3$—TiC", *M. Mat. Sci.* 15, 875–885 (1980)) observe that the fracture toughness of alumina composites in machined-notch tests increases with increasing TiC content and appears to reach a plateau at about 20 w/o TiC. Japanese patent 63-134644 discloses the use of $Al_2O_3$—TiC setter powder to drive the partial pressure of CO to $10^{-4}$-$10^{-3}$ atm during sintering of $Al_2O_3$—TiC. However, no use of $TiO_2$ sintering aid or rapid rate sintering was mentioned.

GTE Valenite Corporation produces $Al_2O_3$ cutting tools from a starting composition of $Al_2O_3$, TiC, MgO, and $ZrO_2$.

SUMMARY OF THE INVENTION

In one aspect the invention is a method of making a continuously sintered ceramic body. The method involves preparing a ceramic green body from a powder mixture including aluminum oxide, or a precursor thereof, and a hard refractory material selected from titanium carbide and titanium carbonitride, or a precursor thereof, in a weight ratio selected to produce in the sintered ceramic body a weight ratio of aluminum oxide to hard refractory material of about 40:60 to about 95:5. The powder mixture further includes an effective amount of a densification aid, and titanium dioxide in an amount selected to produce in the sintered ceramic body a weight ratio of titanium dioxide to aluminum oxide plus hard refractory material of 0:100 to about 2:98. The green body is continuously rapid sintered by heating in a sintering atmosphere using a non-contaminating belt furnace including at least one heating zone to a sintering temperature of about 1800°–1920° C. for a time sufficient to densify the green body to a density of at least about 4.12 g/cc. The rate of travel of the green body through the belt furnace is selected to provide a heating rate above about 800° C. between about 225° C./min. and the rate at which the green body experiences thermal shock. The sintering atmosphere is selected from argon-hydrogen and nitrogen-hydrogen in a molar ratio of argon or nitrogen to hydrogen of about 92:8 to 100:0. Carbon monoxide is introduced to the sintering atmosphere during the sintering step only after the sintering temperature exceeds about 1400° C. The amount of carbon monoxide introduced is selected to inhibit reaction between the aluminum oxide and the hard refractory material.

In a narrower aspect, the invention involves introducing the carbon monoxide to the sintering atmosphere by placing a mass of graphite including adsorbed oxygen and water in proximity to the green body at initiation of the sintering step such that the mass releases carbon monoxide only after the sintering temperature exceeds about 1400° C. In another narrower aspect, the heating means is a tungsten-element, tungsten-belt furnace.

In yet another narrower aspect, preparation of the green body involves blending the powder mixture and sufficient inert liquid medium to produce a homogeneous powder mixture slurry. The slurry is dried to remove a sufficient amount of the inert liquid medium to produce a shapable powder mixture. The shapable powder mixture is then dried to form the green body, the green body having a density of at least about 30 percent of the theoretical density of the sintered ceramic body.

In another aspect, the invention is a method of making a sintered ceramic body. A ceramic green body is prepared from a powder mixture including aluminum oxide and a hard refractory material selected from titanium carbide and titanium carbonitride, in a weight ratio of aluminum oxide to hard refractory material of about 40:60 to about 95:5. The powder mixture further includes an effective amount of a densification aid, up to about 2 weight percent titanium dioxide based on the combined weights of the aluminum oxide, the hard refractory material, and the titanium dioxide, and 0 to about 8 weight percent wax binder based on the total weight of the powder mixture. The green body is presintered in a vacuum or hydrogen by heating to a presintering temperature of about 400°–800° C. for a time sufficient to remove any of the binder present in the green body and to form a presintered green body. The presintered green body is isopressed at a pressure sufficient to substantially completely collapse any cracks, macroscopic pores, or voids remaining in the presintered green body. The isopressed presintered green body is continuously rapid sintered by heating in a sintering atmosphere using a non-contaminating belt furnace including at least one heating zone to a sintering temperature of about 1800°–1920° C. for a time sufficient to densify the isopressed presintered green body to a density of at least about 4.12 g/cc. The rate of travel of the green body through the belt furnace is selected to provide a heating rate above about 800° C. between about 225° C./min. and the rate at which the isopressed presintered green body experiences thermal shock. The sintering atmosphere is selected from argon-hydrogen and nitrogen-hydrogen in a molar ratio of argon or nitrogen to hydrogen of about 92:8 to 100:0. Carbon monoxide is introduced to the sintering atmosphere during the sintering step only after the sintering temperature exceeds about 1400° C. The amount of the carbon monoxide introduced is selected to inhibit reaction between the aluminum oxide and the hard refractory material. In a narrower aspect the invention further involves, after sintering, hot isostatic pressing the sintered body in an inert atmosphere at a temperature of about 1650°–1850° C. and a pressure of about 10–25 ksi for about 5–60 min.

BRIEF DESCRIPTION OF THE DRAWINGS

For a better understanding of the present invention, together with other objects, advantages and capabilities thereof, reference is made to the following Description and appended Claims, together with the Drawings, in which:

DETAILED DESCRIPTION OF THE PREFERRED EMBODIMENTS

Figure 1:
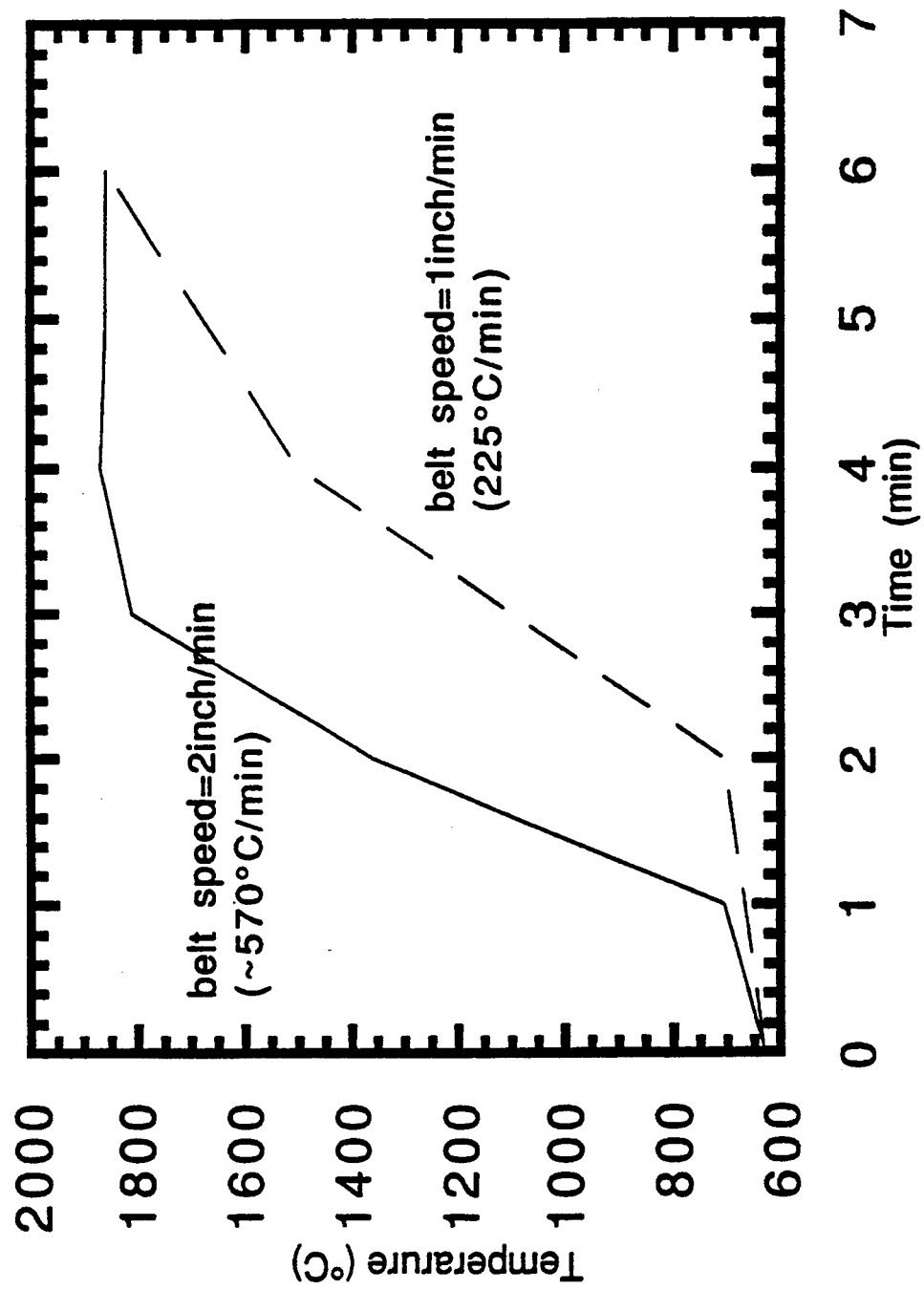
FIG. 1 is a typical temperature profile at each of two belt speeds for one embodiment of the process in accordance with the invention.

An exemplary method in accordance with the present invention is described herein. High-density alumina-TiC composite bodies are produced by a continuous sintering process using starting compositions containing alumina (aluminum oxide or $Al_2O_3$), TiC, $ZrO_2$, and MgO, with or without $TiO_2$. The method involves mixing the starting composition, cold-pressing the powder mixture, and prefiring. The composite bodies are then sintered in a belt furnace at high temperatures under an argon atmosphere containing a minor, controlled amount of CO, at a predetermined heating rate for a time sufficient to produce a high-density body. Alternatively, a sintering atmosphere of $N_2$, Ar-8%$H_2$, or $N_2$-8%$H_2$ may be used. As used herein, the terms "argon-hydrogen", "nitrogen-hydrogen", "Ar-8%$H_2$", and "$N_2$-8%$H_2$" are intended to denote a mixture of argon or nitrogen with hydrogen in a given molar ratio, for example, a ratio of Ar:$H_2$ or $N_2$:$H_2$ of 92:8. Amounts of $H_2$ in Ar or $N_2$ of 0 to about 8 mole percent are within the present invention. A tungsten-element, tungsten-belt furnace is used with a graphite block, for example a graphite boat.

In preparing the green body, a homogeneous, or at least substantially homogeneous, dispersion of powders and any other components is formed. The components include alumina, hard refractory reinforcing materials such as TiC and/or Ti(C,N), densification aids such as $ZrO_2$ and/or MgO, optionally, dopants such as $TiO_2$, and other components such as $La_2O_3$, $Y_2O_3$, $TiB_2$, WC, and/or TiN. The reinforcing materials may be in the form of particles, fibers, whiskers, or platelets. For the non-alumina oxides, inorganic or organic precursors can be used. The precursors should decompose to form the oxides and by-product gas or gases that will not react with the carbides, nitrides, and/or borides added. Representative of suitable precursors of the oxide components are carbonates, hydroxides, nitrides, and stearates of titanium, zirconium, yttrium, lanthanum, and magnesium.

Alumina powder of commercial or technical grade is suitable for carrying out the present process. Specifically, the alumina powder should not contain impurities which would have a significantly deleterious effect on the density and mechanical properties such as hardness and fracture toughness of the resulting sintered product. Preferably, the alumina powder used is at least about 99.8% pure. For example, Alcoa A-16 alumina powder with a surface area of 8.7 $m^2$/g and an average particle size of 0.45 $\mu$m can be used. Similarly, Reynolds HPDBM alumina with a surface area of 7 $m^2$/g, an average particle size of 0.35 $\mu$m, and a purity of 99.9% can also be used.

TiC or Ti(C,N) powder with particle sizes of about 1–5 $\mu$m may be used. For example, Stark TiC powder with a free carbon content less than 0.1 wt. % and oxygen content less than 0.2 wt. % is suitable. The TiC or Ti(C,N) component serves two functions in the final sintered composites: (1) as a reinforcing component to increase the hardness and fracture toughness, and (2) inhibiting grain growth in the alumina.

Technical-grade powders of $ZrO_2$, MgO, and $TiO_2$, such as Harshaw $ZrO_2$ powder, J. T. Baker MgO powder, and Ultrek 99.94% pure $TiO_2$ powder (all −200 mesh) can be used. $ZrO_2$ acts as a toughening agent as well as a sintering (or densification) aid. $ZrO_2$ forms an eutectic liquid with $Al_2O_3$ at about 1850° C. and therefore acts as an agent for liquid-phase sintering. After sintering, $ZrO_2$ typically is present in the form of a tetragonal or monoclinic zirconia phase, which can impart a toughening effect through a martensitic phase transformation from tetragonal to monoclinic symmetry or through microcracking at the tip of any crack. $TiO_2$ serves as an agent to suppress the reaction of $Al_2O_3$ with TiC, and as a sintering aid. The role of $TiO_2$ in suppression of the reaction of TiC with $Al_2O_3$ is discussed in more detail below. After sintering, $TiO_2$ either becomes dissolved in the $Al_2O_3$ lattice or forms alumina-titanate phase in the alumina matrix. The function of MgO is as a sintering aid. After sintering, MgO is dissolved in $Al_2O_3$ and $ZrO_2$.

The alumina and other components or precursors for the other components, can be admixed by a number of techniques, for example, using ball mill containing cobalt-cemented tungsten carbide milling media or an ultrasonic mixer for wet mixing to produce a significantly or substantially uniform or homogeneous dispersion or mixture. The more uniform the dispersion, the more uniform are the microstructure and the properties of the resulting sintered body.

Mixing may be carried out with the powder mixture suspended in a liquid medium to which the other components are added and precursors, if added, dissolved. The liquid should be inert (non-reactive) to the other components. Typical liquids include water, acetone, or hexane. Mixing time varies widely and depends largely on the amount and type of mixing equipment. In general, mixing time ranges from about 1 hour to about 200 hours. A binder or lubricant such as wax or paraffin can be dissolved in the liquid to assist in mixing. The mixed material can be dried by a number of conventional techniques to remove the liquid medium. Preferably, it is dried either by spray drying or by pan drying followed with grinding with mortar and pestle and dry-screening ($-100$ to $-200$ mesh).

Contamination of Co and WC may occur in the milled powder because of the use of WC-Co milling media. However, a small amount of WC and Co contamination is not believed to be harmful to density or strength. Scanning electron microscopy, energy dispersive x-ray analysis and image analysis indicated about 1-2 v/o WC derived from the milling media was present in the sintered bodies described herein.

A number of techniques can be used to shape the homogeneous powder mixture or dispersion into a green body. For example, it can be extruded, injection molded, die-pressed, isostatically pressed, or slip cast to produce the green body of desired shape. For some of these shaping methods, it is preferred to add shaping aids such as a wax binder or a lubricant. As used herein, the term "wax binder" includes organic waxes, paraffin, carbowax (polyethylene glycol), and PVA (polyvinyl alcohol); the term "lubricant" includes oleic acid and stearic acid. Any lubricants, binders, or similar materials used in shaping the powder mixture should have no significant deleterious effect on the properties of the resulting sintered body. Such materials are preferably of the type which evaporate on heating at relatively low temperatures, preferably below 500° C., leaving no significant residue. The green body should have a density of at least 30%, and preferably 45% or higher, of the theoretical density for the alumina-TiC composite to promote densification during sintering and attainment of near-theoretical density.

Preferably, before sintering, the green body or compact is prefired at a temperature ranging from about 400° C. to about 800° C. Typically, the prefiring temperature is about 500°-650° C. at a heating rate of about 2° C./min. to eliminate impurities, including shaping aids and any remaining liquid, which would have a significantly deleterious effect on the density of the sintered body. The particular prefiring temperature and period is determinable empirically, and depends largely on the level of impurities present and on the thickness of the body; it generally ranges from about one to eight hours. Such prefiring allows the sintering atmosphere to be free of impurities, and imparts sufficient strength to the green body to allow it to be more easily handled and machined, if necessary.

The green body is then sintered to achieve full densification, preferably at or near the theoretical density for the materials incorporated into the body. In the process described herein, the sintering process is continuous, rather than batch, and achieves properties comparable to those achieved by batch hot-pressing processes. The maximum sintering temperature typically is about 1800°-1920° C., with sintering time at that maximum temperature typically from about 5 min. to 2 hours. A typical heating cycle is (a) heating at a rate of about 10°-30° C./min from room temperature to about 550° C.; (b) holding at about 550° C. for about 30 min.; (c) heating at a rate of about 10°-30° C./min from about 550° C. to about 800° C.; (d) holding at about 800° C. for about 1h; and heating from about 800° C. to the maximum sintering temperature at a heating rate at or above about 80° C./min. and less than the rate at which the prefired body experiences thermal shock. The heating rate at which the body experiences thermal shock fracture is size-dependent and can readily be determined by empirical means. This maximum heating rate is typically at or above about 400° C./min.

A typical sintering atmosphere is argon, as described above, and is typically a flowing atmosphere with a flow rate of about 50-500 cc/min., preferably about 200 cc/min. A tungsten-element, tungsten-belt furnace is used. The prefired bodies may be placed in a graphite boat on the belt, and conveyed through the furnace at a rate of about 1-3 in/min. The rate is selected to result in a heating rate during the sintering process, at temperatures above about 800° C., of about 225°-900° C./min.

The length of furnace traversed by the bodies, the number and length of heating zones, and the temperature maintained in each zone varies in known manner with the heating cycle selected for the sintering process. Typically, to eliminate any cross-contamination of the bodies in the furnace, the graphite boat is placed in a molybdenum muffle in the belt furnace. However, the decision regarding whether or not to use a muffle typically depends on the degree of cross-contamination anticipated. Both the muffle and the furnace may be purged with flowing argon before the sintering atmosphere is established. To prevent reaction between the molybdenum muffle and the graphite boat, a molybdenum foil may separate the two, or the bottom of the boat may be coated with molybdenum carbide. The use of the muffle is particularly recommended in situations in which the same furnace is used to sinter both the bodies described herein and other materials, even alumina bodies of different composition.

The following Examples are presented to enable those skilled in the art to more clearly understand and practice the present invention. These Examples should not be considered as a limitation upon the scope of the present invention, but merely as being illustrative and representative thereof.

EXAMPLE 1

Alumina-TiC composites were prepared containing 69.3 w/o $Al_2O_3$ (Alcoa A-16), 26.5 w/o TiC (Starck) particulates, 0.2 w/o MgO (Baker), and 4 w/o $Zr_2$ (Harshaw). This starting composition was selected to optimize the properties of the material, for example, the fracture toughness (at room temperature and at high temperature) and the high temperature oxidation resistance.

The powders and a wax binder were dispersed in acetone. The binder was paraffin in an amount of 8 weight % of the powder-binder mixture. The resulting slurry was ball-milled with cobalt-cemented tungsten carbide milling media, then was spray-dried. The dried powder was shaped into pellets about 0.65 by 0.65 by 0.35 inch. As shown in Table I, one of four powder processing methods was used to shape the powder into pellets. In Powder Process A, the powder mixture was uniaxially pressed at 35 ksi to 58% green density. The green bodies were heated in vacuum at 2°–3° C./min. to 300° C. for 30 min. and then to 500° C. for 2h to remove the binder. In Powder Process B, the dried powder mixture was uniaxially pressed and prefired as in Process A, then re-isopressed at 22 ksi. In another alternative, Powder Process C, the dried powder mixture was uniaxially pressed and prefired as in Process A, outgassed at 550° C. in vacuum for 8h, then re-isopressed at 22 ksi. In a fourth alternative, Powder Process D, the spray-dried powder was first heated to 550° C. for 2h in vacuum to remove the binder. The debindered powder was screened through a Teflon 100 mesh screen. The screened powder was uniaxially pressed at 11 ksi. The pellets were then subjected to another heat treatment using a heating rate of 2° C./min. to 550° C., and holding at that temperature for 5h to completely remove the binder and to impart some strength for handling. This alternative procedure was found to be preferable because the binder was completely removed, and delamination, which can occur in prefired bodies, was eliminated. After prefiring, the bodies were re-isopressed at 22 ksi in order to collapse any cracks, large pores, or voids remaining after the binder was removed. This step was found to be advantageous because it eliminated large voids in the sintered bodies that could act as critical flaws.

For some of the samples, 1 w/o $TiO_2$ was added to the binder-removed powder, as shown in Table I, using a mortar and pestle, preferably of $B_4C$. The mixing was effected by mixing the additive with about 20% of the binder-removed powder, then gradually adding more powder as mixing progressed. The doped powder was then screened and processed as described above.

Sintering was conducted in a Centorr Furnace Co. model BF tungsten-element, tungsten-belt furnace, i.e., a furnace equipped with tungsten heating elements, Mo heat shields, and tungsten belt. The temperature profiles at belt speeds of 1 in/min. and 2 in/min. is shown in FIG. 1. The temperature calibration was carried out using a prefired compact blank having a thermocouple inserted into a hole drilled in its side. The blank was then processed in the same manner as the samples, as described below, and the temperature/time variations measured.

Each sample was placed, without setter powder, in a small graphite boat (unless no boat is indicated in Table I). The boats were placed in a Mo muffle and were separated from the Mo muffle by a Mo foil. The Mo muffle was about 1–2 in wide × 0.75 in high × 36 in long, and was placed to sit on the tungsten belt. The boats move in unison with the muffle as the belt moves through the furnace. The muffle was positioned in the furnace and the samples were placed in the muffle so that the maximum sample temperature would be about 600° C. when the maximum furnace temperature was 1860° C. The furnace was purged with flowing argon, then the argon flow rate was adjusted. A flowing argon atmosphere was maintained outside of the Mo muffle in the furnace. A predetermined amount of argon gas flow was also maintained inside the Mo muffle in the furnace.

The temperature of the samples was increased, held, or decreased by holding the samples, in the muffle, near the hot zone as the furnace was preheated, then passing through the hot zone on the moving belt. This process was designed to be equivalent to a process using more sophisticated apparatus, for example a three zone belt furnace. The effective rate of heating to the maximum temperature of 1860° C. is shown in Table I. The furnace was heated at a rate selected to give a sample heating rate of about 30° C./min. to 550° C., and held at temperature for 30 min.

At this point, the belt speed was set to effect a sample heating rate of about 10° C./min to 800° C., and the temperature maintained for 1h. The belt speed was then set to that indicated in Table 1 to give the heating rate also indicated in Table I up to the maximum temperature of 1860° C., and the temperature was maintained for the time indicated. The samples were withdrawn to the position effecting a 550° C. sample temperature. The furnace was then shut off and the samples allowed to cool to room temperature. During heating, a relatively slow heating rate at temperatures from room temperature to 550° C. and to 800° C. and the hold at 550° C. and 800° C. were effected to avoid thermal shock fracture. Table I shows the results achieved by sintering the samples of Example 1, with a specimen hot-pressed at 1700° C. to a density of 4.244 g/cc included as a comparative sample.

TABLE I

| SAMPLE | POWDER PROCESS | BELT SPEED (in/min) | EFFECTIVE HEATING RATE (°C./min) | SINTERING TIME (min) | DENSITY (g/cc) | REMARKS |
| --- | --- | --- | --- | --- | --- | --- |
| 1 (hot-press sample) | — | — | — | — | 4.244 | — |
| 2* | A | 1 | 225 | 30 | 4.045 | delamination |
| 3* | A | 1 | 225 | 30 | 4.045 | delamination |
| 4 | A | 1 | 225 | 30 | 4.020 | delamination |
| 5* | A | 1 | 225 | 30 | 4.113 | delamination |
| 6 | A | 2 | 570 | 30 | 3.952 | delamination |

TABLE I-continued

| SAMPLE | POWDER PROCESS | BELT SPEED (in/min) | EFFECTIVE HEATING RATE (°C./min) | SINTERING TIME (min) | DENSITY (g/cc) | REMARKS |
|---|---|---|---|---|---|---|
| 7* | A | 2 | 570 | 30 | 4.126 | delamination |
| 8 | B | 2 | 570 | 30 | 3.943 | no delamination |
| 9* | B | 2 | 570 | 30 | 4.062 | no delamination |
| 10 | A | 2 | 570 | 30 | 3.998 | delamination |
| 11* | A | 2 | 570 | 30 | 4.130 | delamination |
| 12 | C | 2 | 570 | 30 | 4.015 | no delamination |
| 13* | C | 2 | 570 | 30 | 4.117 | no delamination |
| 14* | B | 3 | 900 | 30 | 3.960 | no delamination |
| 15 | B | 3 | 900 | 30 | 4.041 | no delamination |
| 16* | B | 3 | 900 | 30 | 4.058 | no delamination |
| 17 | B | 3 | 900 | 30 | 3.964 | no delamination |
| 18* | D | 1.65 | 400 | 45 | 4.238 | no delamination |
| 19 | C | 1.65 | 400 | 45 | 4.028 | no delamination |
| 20* | C | 1.65 | 400 | 45 | 4.028 | no delamination |
| 21* | D | 1.65 | 400 | 45 | 4.234 | no delamination |
| 22* | A | 2** | 570 | 30 | 3.910 | delamination |
| 23 | A | 2** | 570 | 30 | 3.990 | delamination |

*Contains 1 w/o TiO$_2$ in starting formulation. Otherwise no TiO$_2$ was added.
**No graphite boat used Without the use of TiO$_2$ dopant, a sintered density of 4.053 g/cc was achieved by sintering at 1860° C. in argon for 45 min. using a heating rate to maximum temperature of 400° C./min. Sintering at higher temperatures was found to result in bloating, while lower temperatures led to lower sintered density. The heating rate within the range studied did not appear to have a pronounced effect on the final density. The composites doped with 1 w/o TiO$_2$ were sintered to densities (4.238 g/cc and 4.234 g/cc for Samples 18 and 21 respectively) approaching that of the hot-pressed sample (4.244 g/cc for Sample 1), while the undoped samples had lower densities. This is believed to be an effect of the retardation, by the TiO$_2$, of Reaction 1:

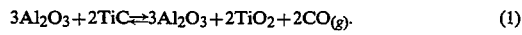

$$3Al_2O_3 + 2TiC \rightleftharpoons 3Al_2O_3 + 2TiO_2 + 2CO_{(g)}. \quad (1)$$

The above results suggest that Reaction (1) must be further suppressed to improve the sintered density. Two modifications were included to suppress this reaction: (1) 1 w/o TiO$_2$ dopant was added to the starting composition, and (2) the prefired body was placed on a piece of graphite boat in the furnace. Graphite is known to release CO$_{(g)}$ at high temperatures. The CO$_{(g)}$ released from the graphite serves to move the direction of Reaction (1) to the left, thus inhibiting the reaction of alumina with TiC. As described in Japanese Patent No. 63-134644, the optimal partial pressure of CO$_{(g)}$ during sintering of alumina-TiC should be about 10$^{-4}$ to 10$^{-3}$ atm. Thermodynamic calculations by Kim and Lee ("Pressureless Sintering of Alumina-Titanium Carbide Composites", J. Am. Cer. Soc. 72 [8]1333-37 (1989)) showed the equilibrium partial pressure of CO$_{(g)}$ was 4.4×10$^{-3}$ atm at 1900° C. If the CO$_{(g)}$ level is too high, TiC tends to react with alumina to form TiO$_2$ and carbon. According to M. Lee and M. P. Borom ("Rapid Rate Sintering of Al$_2$O$_3$—TiC Composites for Cutting Tool Applications", Adv. Cer. Mat. 3 [1]38-44 (1988)), if the level of CO$_{(g)}$ is higher than 2.5 v/o, the sintered density decreases by 2-3% of theoretical. In the past, prefired bodies were typically embedded in a setter powder consisting of mixtures of alumina and TiC to achieve the desired equilibrium partial pressure of CO$_{(g)}$ during sintering.

A graphite boat (about 5 g) was placed in the 1 inch Mo muffle inside the belt furnace with a chamber volume of about 265 cc. Graphite adsorbs oxygen and moisture at room temperature, and outgasses at high temperatures (e.g. about 1800° C.), and the amount of outgassing is about 0.008 w/o with CO$_{(g)}$ being the dominant offgassing product (G. C. Wei et al., "Outgassing Behavior of Carbon-Bonded Carbon-Fiber Thermal Insulation", Proc. Carbon Conf., p. 249-250 (1979)). This corresponds to about 1.2×10$^{-2}$ atm partial pressure of CO$_{(g)}$ at 1800° C., which is sufficiently high to suppress Reaction (1), and sufficiently low so as not to react with TiC.

Sampling and analysis of the gaseous atmosphere during sintering was difficult because of its transient nature. The results of sintering of alumina-TiC composites in the presence of a graphite boat, however, strongly indicated that the outgassing theory would operate so as to be beneficial to the sintered density.

The use of the graphite boat to modify the sintering atmosphere in the belt furnace has some advantages over the use of setter powder or flowing Ar—CO gas mixtures. First, graphite outgassing starts at about 1600° C. and reaches a maximum at about 1800° C. Thus, below these temperatures, the sintering atmosphere is essentially pure Ar, and above about 1800° C. the Ar gas effectively contains a small level of CO. Thus, the CO is generated at the temperatures where the presence of CO is needed. This method of in-situ generation of CO eliminates the need for a costly storage facility for gas cylinders containing Ar—CO mixtures. The technique also releases CO in the temperature range ($\geq$1600° C.) where the sample is about to reach a closed-porosity stage, and where a small amount of CO is needed to suppress the reaction of Al$_2$O$_3$ with TiC. Attempts to dope the sintering atmospheres with CO at temperatures from 800° to 1600° C. did not appear to be beneficial; in fact, bloating or expansion was observed. If the Ar sintering atmosphere contains some CO at the temperature range from room temperature to 1400° C., where the samples are in an open-porosity state, CO might actually (a) reduce Al$_2$O$_3$ to release oxygen-bearing gaseous species which would oxidize TiC to form TiO$_2$, or (b) directly react with TiC, as shown in Reaction (2):

$$TiC + 2CO \rightleftharpoons TiO_2 + 3C. \quad (2)$$

Reaction 2 takes place only if the temperature is below 1500K, as discussed in Kim and Lee's paper. The above two possibilities can cause the bloating at the temperature range from 800° to 1600° C. in CO-containing atmosphere, as observed by Lee and Borom. Therefore, the in-situ generation of CO via using the graphite boat has the advantage of releasing the desired level of CO at the appropriate temperature range.

When the graphite boat was used, Ar was preferred over Ar-8%$H_2$ or $N_2$-8%$H_2$. This was because $H_2$ can react with graphite and CO to form $CH_4$, which can affect densification of $Al_2O_3$—TiC composites.

With the two modifications: (a) adding 1 w/o $TiO_2$ to the starting composition, and (b) placing a graphite boat in the belt furnace to introduce a small amount of $CO_{(g)}$, sintering temperatures ranging from 1750° C. to 1880° C. were suitable, with the preferred temperature being 1860° C. Above about 1880° C, the specimens bloated, and below 1750° C., high sintered density was difficult to attain. Ar sintering atmosphere was found to be preferred over Ar-8%$H_2$ or $N_2$-8%$H_2$, when the above two modifications were employed.

Compacts sintered at 1860° C. for 45 min. at a heating rate of 400° C./min. in Ar doped with a small amount of CO via the graphite boat, had densities of up to 4.238 g/cc (Sample 18). These results were reproduced on repeating runs, particularly for samples produced using Powder Process D. The density of the hot-pressed sample (Sample 1) was 4.244 g/cc. Thus, the density achieved in the hot pressed sample (Sample 1) effectively has been matched by using a combination of (a) rapid rate belt sintering, (b) adding $TiO_2$ to the compact as a sintering aid, and (c) adding CO via the graphite boat to the sintering atmosphere in the belt furnace. The microstructure of these sintered bodies appears to be uniform upon optical microscopic examination.

EXAMPLE 2

Additional samples were produced as described for Example 1, including 1 w/o $TiO_2$ and using Powder Process D. The atmosphere was argon, and the belt speed was 1.65 in/min. A graphite boat and Mo muffle, as described above, were used during sintering. The densities achieved with these samples, as shown in Table II, also approach that achieved in the hot-pressed sample (Sample 1) substantiating the above described findings.

TABLE II

| SAMPLE | SINTERING TEMP. (°C.) | SINTERING TIME (min) | DENSITY (g/cc) |
| --- | --- | --- | --- |
| 24 | 1860 | 45 | 4.190 |
| 25 | 1860 | 45 | 4.120 |
| 26 | 1860 | 30 | 4.200 |
| 27 | 1860 | 5 | 4.210 |
| 28 | 1860 | 5 | 4.130 |
| 29 | 1860 | 5 | 4.150 |
| 30 | 1860 | 1 | 4.110 |
| 31 | 1800 | 45 | 4.180 |
| 32 | 1800 | 5 | 4.140 |
| 33 | 1800 | 1 | 4.110 |

EXAMPLE 3

Hardness and fracture toughness of some of the above samples were measured. Table III summarizes the hardness and fracture toughness data for sintered $Al_2O_3$—TiC composites containing titania (Samples 18 and 21), and the comparative hot pressed sample containing no titania (Sample 1).

TABLE III

| SAMPLE | DENSITY (g/cc) | RELATIVE KNOOP HARDNESS* | RELATIVE FRACTURE TOUGHNESS* |
| --- | --- | --- | --- |
| hot-pressed | | | |
| 1 | 4.244 | 1.00 | 1.00 |
| sintered | | | |
| 18 | 4.238 | 1.19 | 1.05 |
| 21 | 4.234 | 1.04 | 0.90 |

*Relative to Sample 1.

The density and hardness values of the sintered Samples 18 and 21 are equivalent to or better than that of hot-pressed Sample 1 containing no $TiO_2$. The fracture toughness value of sintered Sample 18 is equivalent to the hot-pressed sample, while that of sintered Sample 21 is within an acceptable range. Overall, the properties of the $TiO_2$-doped specimens sintered in a continuous process at 1860° C. for 45 min. in Ar containing a small amount of CO (via the graphite boat) at a heating rate of 400° C./min. are improved over or at least equivalent to the hot-pressed specimen containing no $TiO_2$.

Microstructural analysis of Sample 18 showed TiC particles dispersed in $Al_2O_3$ matrix. The average grain size in the $Al_2O_3$ matrix was about 3 μm. Precipitates of $Al_2TiO_5$ were found inside grains that appeared to be $Al_2O_3$—$TiO_2$ solid solution. Tetragonal $ZrO_2$ phase was located at grain boundaries. A minor amount of WC phase derived from the powder milling media was also found at grain boundaries.

The major differences in the microstructure of the sintered Sample 18 vs hot-pressed Sample 1 were (1) $Al_2TiO_5$ precipitates were inside grains in the sintered specimen, but at grain boundaries in the hot-pressed specimen, and (2) $ZrO_2$ phase appeared to include tetragonal and monoclinic phases in the sintered specimen, but only monoclinic in the hot-pressed specimen. The difference might be related to the higher temperature (1860° C. vs 1700° C.) and a fast cooling (about 100° C./min. vs <100° C./min.) used in sintering vs hot-pressing. Although the microstructural difference may have contributed somewhat to the improved properties in the sintered bodies, even achievement of equivalent properties without hot-pressing is a significant advance in the art.

EXAMPLE 4

Samples prepared and sintered as described for Example 2 were subjected to hot isostatic pressing (HIPing) using a cladless HIPing process in a graphite-element, graphite-shield HIP unit. The starting composition contained 69.3 w/o $Al_2O_3$, 26.5 w/o TiC particulates, 0.2 w/o MgO, 4 w/o $ZrO_2$, and 1 w/o $TiO_2$. Sintering was carried out at 1800° C. or 1860° C. for various times at a belt speed of 1.65 in/min. (equivalent to about 400° C./min.) under Ar in the above-described belt furnace. The HIP process was conducted at 1700° C. for 30 min. under 15 ksi argon. The heating rate was about 100° C./min., and about 7.5 ksi of argon was applied when the temperature reached 850° C. After the 30 min. hold at 1700° C., the temperature was lowered to 700° C. at a cooling rate of about 100° C./min., then the pressure was released. The samples were then furnace-cooled to room temperature. Table IV lists the sintering time and temperature and the properties of the continuously rapid-sintered and HIPed samples, and properties of the comparative, hot-pressed sample (Sample 1).

As shown in Table IV, the density of continuously rapid-sintered and HIPed samples was 4.32 g/cc, higher than either the uniaxially hot-pressed or the continuously rapid-sintered samples. This indicates that residual pores in the rapid-sintered samples were eliminated during HIPing. The hardness of the sintered and HIPed samples was higher than that of uniaxially hot-pressed Sample 1. The fracture toughness of Sample 34 was 17% higher than that of Sample 1, and that of Sample 42 was within an acceptable range. Thus the process combining continuous rapid-sintering and cladless hot isostatic pressing has been shown to produce alumina-TiC composites with generally improved properties compared to those of similar materials prepared by uniaxial hot-pressing.

debinding-pressing-burnout-pressing) procedure to assure elimination of delamination and large voids. The process achieves density, hardness, and fracture toughness equivalent to or better than those produced in the uniaxially hot-pressed bodies of similar composition without $TiO_2$.

While there has been shown and described what are at present considered the preferred embodiments of the invention, it will be obvious to those skilled in the art that various changes and modifications can be made therein without departing from the scope of the invention as defined by the appended claims.

We claim:

1. A method of making a continuously sintered ceramic body comprising the steps of:

preparing a ceramic green body from a powder mixture comprising aluminum oxide, or a precursor

TABLE IV

| SAMPLE | SINTERING TIME (min) | SINTERED DENSITY (g/cc) | FINAL DENSITY (g/cc) | RELATIVE KNOOP HARDNESS* | RELATIVE FRACTURE TOUGHNESS* |
|---|---|---|---|---|---|
| HOT PRESSED | | | | | |
| 1 | — | — | 4.244 | 1.00 | 1.00 |
| SINTERING TEMP. = 1860° C. | | | | | |
| 34 | 45 | 4.126 | 4.32 | 1.03 | 1.17 |
| 35 | 5** | 4.155 | 4.32 | | |
| 36 | 5** | 4.155 | 4.32 | | |
| 37 | 5 | 4.13 | 4.32 | | |
| 38 | 5 | 4.15 | 4.32 | | |
| 39 | 1 | 4.11 | 4.32 | | |
| SINTERING TEMP. = 1800° C. | | | | | |
| 40 | 45 | 4.181 | 4.32 | | |
| 41 | 5 | 4.14 | 4.32 | | |
| 42 | 1 | 4.11 | 4.32 | 1.01 | 0.92 |

*Relative to Sample 1; measured after HIPing.
**Sintered using 2 inch Mo muffle. All others sintered using 1 inch Mo muffle.

The starting composition used in the Examples above contains 69.3 w/o $Al_2O_3$, 26.5 w/o TiC particulates, 0.2 w/o MgO, and 4 w/o $ZrO_2$, and, optionally, 1 w/o $TiO_2$. The invention, however, is not limited to this composition. For example, the carbide content may be about 5–60 w/o. Similarly, other proportions of or compounds suitable for use as sintering aids may be used. TiN may be added for further sinterability and/or property (more thermal shock resistant) advantage. Ti(C,N) particulates could be used in place of TiC particulates for higher hardness, or TiC whiskers could be substituted for TiC particulates for higher fracture toughness.

As to the process steps, microwave heating may be substituted for the described W-element heating in the belt furnace. The partial pressure of CO may be dynamically controlled during heating since reaction (1) and the equilibrium pressure of CO are temperature dependent. The sintered specimens can subsequently be hot isostatically pressed (HIPed) in a cladless configuration to further eliminate residual pores.

The method described herein presents to the art a process for achieving properties at least equivalent to those obtained in alumina-TiC composites by uniaxial hot-pressing. Excellent results are achieved by a method including (1) the starting composition of $Al_2O_3$, TiC, sintering aids, and, optionally, $TiO_2$ in combination with (2) continuous processing in a belt furnace, (3) a rapid rate of heating, (4) the use of $N_2$-8%$H_2$ sintering atmosphere for the starting composition without $TiO_2$ or the use of Ar sintering atmosphere for the starting composition with $TiO_2$, (5) the use of a graphite boat in the tungsten-element, tungsten-belt furnace under Ar, and (6) the double-burnout, double-pressing (powder thereof, and a hard refractory material selected from the group consisting of titanium carbide and titanium carbonitride, or a precursor thereof, in a weight ratio selected to produce in said sintered ceramic body a weight ratio of aluminum oxide to hard refractory material of about 40:60 to about 95:5, and further comprising an effective amount of a densification aid, and titanium dioxide in an amount selected to produce in said sintered ceramic body a weight ratio of titanium dioxide to aluminum oxide plus hard refractory material of 0:100 to about 2:98;

continuously rapid sintering said green body by heating in a sintering atmosphere using a tungsten element belt furnace including at least one heating zone to a sintering temperature of about 1800°–1920° C. for a time sufficient to densify said green body to a density of at least about 4.12 g/cc, wherein the rate of travel of said green body through said tungsten element belt furnace is selected to provide a heating rate above about 800° C. between about 225° C./min. and the rate at which said green body experiences thermal shock, and said sintering atmosphere is selected from the group consisting of argon-hydrogen and nitrogen-hydrogen in a molar ratio of argon or nitrogen to hydrogen of about 92:8 to 100:0;

introducing carbon monoxide to said sintering atmosphere during said sintering step only after said sintering temperature exceeds about 1400° C., wherein the amount of said carbon monoxide introduced is selected to inhibit reaction between said aluminum oxide and said hard refractory material.

2. A method in accordance with claim 1 wherein said powder mixture comprises about 1 weight percent titanium dioxide, and said sintering atmosphere is argon.

3. A method in accordance with claim 1 wherein said powder mixture includes no titanium dioxide and said sintering atmosphere consists essentially of at least one of argon-hydrogen and nitrogen-hydrogen in a molar ratio of argon or nitrogen to hydrogen of about 92:8.

4. A method in accordance with claim 1 wherein said effective amount of a sintering aid comprises about 0.2 weight percent magnesium oxide and about 4 weight percent zirconium oxide.

5. A method in accordance with claim 1 wherein said sintering step is carried out for about 5 min. to about 2 hours.

6. A method in accordance with claim 1 wherein said step of introducing said carbon monoxide to said sintering atmosphere comprises placing a mass of graphite including adsorbed oxygen and water in proximity to said green body at initiation of said sintering step such that said mass releases carbon monoxide only after said sintering temperature exceeds about 1400° C.

7. A method in accordance with claim 1 wherein said step of preparing said green body comprises:
blending to produce a homogeneous powder mixture slurry said powder mixture and sufficient inert liquid medium to produce said slurry;
drying said slurry to remove a sufficient amount of said inert liquid medium to produce a shapable powder mixture;
shaping said shapable powder mixture to form said green body, said green body having a density of at least about 30 percent of the theoretical density of said sintered ceramic body.

8. A method of making a sintered ceramic body comprising the steps of:
preparing a ceramic green body from a powder mixture comprising aluminum oxide and a hard refractory material selected from the group consisting of titanium carbide and titanium carbonitride, in a weight ratio of aluminum oxide to hard refractory material of about 40:60 to about 95:5, and further comprising an effective amount of a densification aid, up to about 2 weight percent titanium dioxide based on the combined weights of said aluminum oxide, said hard refractory material, and said titanium dioxide, and 0 to about 8 weight percent wax binder based on the total weight of said powder mixture;
presintering said green body in a vacuum or hydrogen by heating to a presintering temperature of about 400°-800° C. for a time sufficient to remove any of said binder present in said green body and to form a presintered green body;
isopressing said presintered green body at a pressure sufficient to substantially completely collapse any cracks, macroscopic pores, or voids remaining in said presintered green body;
continuously rapid sintering said isopressed presintered green body by heating in a sintering atmosphere using a non-contaminating belt furnace including at least one heating zone to a sintering temperature of about 1800°-1920° C. for a time sufficient to densify said isopressed presintered green body to a density of at least about 4.12 g/cc, wherein the rate of travel of said green body through said belt furnace is selected to provide a heating rate above about 800° C. between about 225° C./min. and the rate at which said isopressed presintered green body experiences thermal shock, and said sintering atmosphere is selected from the group consisting of argon-hydrogen and nitrogen-hydrogen in a molar ratio of argon or nitrogen to hydrogen of about 92:8 to 100:0;
introducing carbon monoxide to said sintering atmosphere during said sintering step only after said sintering temperature exceeds about 1400° C., wherein the amount of said carbon monoxide introduced is selected to inhibit reaction between said aluminum oxide and said hard refractory material.

9. A method in accordance with claim 8 further comprising the step, after the sintering step, of:
hot isostatic pressing said sintered body in an inert atmosphere at a temperature of about 1650°-1850° C. and a pressure of about 10-25 ksi for about 5-60 min.

10. A method in accordance with claim 8 wherein said belt furnace is a tungsten-element, tungsten-belt furnace.

11. A method in accordance with claim 8 wherein said step of preparing said green body comprises:
blending to produce a homogeneous powder mixture slurry said powder mixture and sufficient inert liquid medium to produce said slurry;
drying said slurry to remove a sufficient amount of said inert liquid medium to produce a shapable powder mixture;
shaping said shapable powder mixture to form said green body, said green body having a density of at least about 30 percent of the theoretical density of said sintered ceramic body.

12. .A method in accordance with claim 11 wherein said shaping step comprises shaping said shapable powder mixture to form said green body by die-pressing, injection molding, extrusion, isostatic pressing, or slip casting.

* * * * *